United States Patent
Leque et al.

(10) Patent No.: US 11,220,960 B2
(45) Date of Patent: Jan. 11, 2022

(54) SUPERPOSITION GEARBOX FOR ENGINE PERFORMANCE

(71) Applicant: United Technologies Corporation, Farmington, CT (US)

(72) Inventors: Nicholas D. Leque, Vernon, CT (US); Joseph H. Polly, Tolland, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 85 days.

(21) Appl. No.: 16/591,716

(22) Filed: Oct. 3, 2019

(65) Prior Publication Data
US 2021/0102499 A1    Apr. 8, 2021

(51) Int. Cl.
*F02C 7/36*    (2006.01)
*F16H 3/46*    (2006.01)
*F16H 57/02*   (2012.01)

(52) U.S. Cl.
CPC ............... *F02C 7/36* (2013.01); *F16H 3/46* (2013.01); *F16H 57/02* (2013.01); *F05D 2220/32* (2013.01); *F05D 2240/60* (2013.01); *F16H 2057/02026* (2013.01)

(58) Field of Classification Search
CPC ...... F02C 7/36; F02C 7/32; F16H 3/46; F16H 57/02; F16H 2057/02026; F05D 2220/32; F05D 2240/60; F05D 2260/40311; F05D 2260/4031
See application file for complete search history.

(56) References Cited

U.S. PATENT DOCUMENTS

| | | | |
|---|---|---|---|
| 7,758,302 B2 | 7/2010 | Linet et al. | |
| 2006/0183593 A1 | 8/2006 | Beutin et al. | |
| 2009/0007569 A1 | 1/2009 | Lemmers, Jr. et al. | |
| 2011/0101693 A1 | 5/2011 | Goi et al. | |
| 2012/0308362 A1 | 12/2012 | Eleftheriou | |
| 2018/0010522 A1 | 1/2018 | Harder et al. | |
| 2018/0010523 A1 | 1/2018 | Harder et al. | |
| 2018/0149091 A1* | 5/2018 | Howell | F16H 37/065 |

FOREIGN PATENT DOCUMENTS

| | | |
|---|---|---|
| DE | 102007004274 A1 | 7/2008 |
| WO | 2008082336 A1 | 7/2008 |

OTHER PUBLICATIONS

The Extended European Search Report for Application No. 20199703.8-1007; Report dated Jan. 20, 2021; Report Received: Jan. 29, 2021; 8 pages.

* cited by examiner

*Primary Examiner* — Jacob M Amick
*Assistant Examiner* — Charles J Brauch
(74) *Attorney, Agent, or Firm* — Cantor Colburn LLP

(57) ABSTRACT

A gas turbine engine including a low speed spool including a low pressure compressor, a low speed output gear disposed on the low speed spool, a high speed spool including a high pressure compressor, a high speed output gear disposed on the high speed spool, a first tower shaft engaged to the low speed spool at the low speed output gear, a second tower shaft engaged to the high speed spool at the high speed output gear, and a superposition gearbox. The gas turbine engine further including a ring gear shaft coupled to drive the ring gear, a ring gear shaft drive gear. A low speed spool drive train gear ratio is between 0.5 to 2.0, the low speed spool drive train gear ratio being measured from the low speed output gear to the ring gear shaft drive gear.

20 Claims, 7 Drawing Sheets

SUPERPOSITION GEARBOX FOR ENGINE PERFORMANCE

BACKGROUND

The subject matter disclosed herein generally relates to gas turbine engines and, more particularly, to driving accessory gearboxes of a gas turbine engine.

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

A high pressure turbine drives the high pressure compressor through an outer shaft to form a high spool, and the low pressure turbine drives the low pressure compressor through an inner shaft to form a low spool. The fan section may also be driven by the low pressure turbine through the inner shaft.

The engine is typically started by driving the high spool through a tower shaft through an accessory gearbox. Once the high spool is up to speed, the low spool follows and the engine is brought to an idle condition. When the engine is operating, the accessory gearbox is driven through the same tower shaft to drive accessory components such as hydraulic pumps and electric generators. The loads from the accessory gearbox on the high spool reduce efficiency.

Turbine engine manufacturers continue to seek further improvements to engine performance including improvements to thermal, transfer and propulsive efficiencies.

SUMMARY

According to an embodiment, a gas turbine engine is provided. The gas turbine engine including a low speed spool including a low pressure compressor, a low speed output gear disposed on the low speed spool, a high speed spool including a high pressure compressor, a high speed output gear disposed on the high speed spool, a first tower shaft engaged to the low speed spool at the low speed output gear, a second tower shaft engaged to the high speed spool at the high speed output gear, and a superposition gearbox. The super position gearbox including a sun gear, a plurality of intermediate gears engaged to the sun gear and supported in a carrier, and a ring gear circumscribing the intermediate gears. The gas turbine engine further including a ring gear shaft coupled to drive the ring gear, a ring gear shaft drive gear disposed on the ring gear shaft and engaged with the first tower shaft, a sun gear shaft coupled to drive the sun gear, and a sun gear shaft drive gear disposed on a sun gear shaft and engaged with the second tower shaft. A low speed spool drive train gear ratio is between 0.5 to 2.0, the low speed spool drive train gear ratio being measured from the low speed output gear to the ring gear shaft drive gear.

In addition to one or more of the features described above, or as an alternative, further embodiments may include a first clutch assembly for selectively coupling the first tower shaft to the ring gear, a second clutch assembly for selectively coupling the sun gear to the carrier, and an accessory gearbox driven by an output of the superposition gearbox.

In addition to one or more of the features described above, or as an alternative, further embodiments may include that the output of the superposition gearbox includes a lay shaft coupled to the carrier.

In addition to one or more of the features described above, or as an alternative, further embodiments may include that the first tower shaft and the second tower shaft are concentric about a common axis.

In addition to one or more of the features described above, or as an alternative, further embodiments may include that the first tower shaft and the second tower shaft are disposed about different axes.

In addition to one or more of the features described above, or as an alternative, further embodiments may include that the first clutch assembly and the second clutch assembly include one-way mechanical clutches.

In addition to one or more of the features described above, or as an alternative, further embodiments may include that the superposition gearbox is not fixed to a static structure of the engine.

In addition to one or more of the features described above, or as an alternative, further embodiments may include that a high speed spool drive train gear ratio is between 0.8 to 2.0. The high speed spool drive train gear ratio being measured from the high speed output gear to the sun gear shaft drive gear In addition to one or more of the features described above, or as an alternative, further embodiments may include that an epicycle gear ratio is between 2.5 to 4.5, the epicycle gear ratio being measured from the ring gear to the sun gear In addition to one or more of the features described above, or as an alternative, further embodiments may include that an epicycle gear ratio is between 2.5 to 4.5, the epicycle gear ratio being measured from the ring gear to the sun gear.

According to another embodiment, a gas turbine engine is provided. The gas turbine engine including a low speed spool including a low pressure compressor, a low speed output gear disposed on the low speed spool, a high speed spool including a high pressure compressor, a high speed output gear disposed on the high speed spool, a first tower shaft engaged to the low speed spool at the low speed output gear, a second tower shaft engaged to the high speed spool at the high speed output gear, and a superposition gearbox. The superposition gearbox including a sun gear, a plurality of intermediate gears engaged to the sun gear, and supported in a carrier and a ring gear circumscribing the intermediate gears. The gas turbine engine further including a ring gear shaft coupled to drive the ring gear, a ring gear shaft drive gear disposed on the ring gear shaft and engaged with the first tower shaft, a sun gear shaft coupled to drive the sun gear, and a sun gear shaft drive gear disposed on a sun gear shaft and engaged with the second tower shaft. A high speed spool drive train gear ratio is between 0.8 to 2.0, the high speed spool drive train gear ratio being measured from the high speed output gear to the sun gear shaft drive gear.

In addition to one or more of the features described above, or as an alternative, further embodiments may include a first clutch assembly for selectively coupling the first tower shaft to the ring gear, a second clutch assembly for selectively coupling the sun gear to the carrier, and an accessory gearbox driven by an output of the superposition gearbox.

In addition to one or more of the features described above, or as an alternative, further embodiments may include that the output of the superposition gearbox includes a lay shaft coupled to the carrier.

In addition to one or more of the features described above, or as an alternative, further embodiments may include that the first tower shaft and the second tower shaft are concentric about a common axis.

In addition to one or more of the features described above, or as an alternative, further embodiments may include that the first tower shaft and the second tower shaft are disposed about different axes.

In addition to one or more of the features described above, or as an alternative, further embodiments may include that the first clutch assembly and the second clutch assembly include one-way mechanical clutches.

In addition to one or more of the features described above, or as an alternative, further embodiments may include that the superposition gearbox is not fixed to a static structure of the engine.

In addition to one or more of the features described above, or as an alternative, further embodiments may include that an epicycle gear ratio is between 2.5 to 4.5, the epicycle gear ratio being measured from the ring gear to the sun gear.

According to another embodiment, a gas turbine engine is provided. The gas turbine engine including: a low speed spool including a low pressure compressor, a low speed output gear disposed on the low speed spool, a high speed spool including a high pressure compressor, a high speed output gear disposed on the high speed spool, a first tower shaft engaged to the low speed spool at the low speed output gear, a second tower shaft engaged to the high speed spool at the high speed output gear, and a superposition gearbox. The super position gearbox including a sun gear, a plurality of intermediate gears engaged to the sun gear, and supported in a carrier and a ring gear circumscribing the intermediate gears. The gas turbine engine further including a ring gear shaft coupled to drive the ring gear, a ring gear shaft drive gear disposed on the ring gear shaft and engaged with the first tower shaft, a sun gear shaft coupled to drive the sun gear, and a sun gear shaft drive gear disposed on a sun gear shaft and engaged with the second tower shaft. An epicycle gear ratio is between 2.5 to 4.5, the epicycle gear ratio being measured from the ring gear to the sun gear.

In addition to one or more of the features described above, or as an alternative, further embodiments may include a first clutch assembly for selectively coupling the first tower shaft to the ring gear, a second clutch assembly for selectively coupling the sun gear to the carrier, and an accessory gearbox driven by an output of the superposition gearbox.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

The detailed description explains embodiments of the present disclosure, together with advantages and features, by way of example with reference to the drawings.

DETAILED DESCRIPTION

A detailed description of one or more embodiments of the disclosed apparatus and method are presented herein by way of exemplification and not limitation with reference to the Figures.

Figure 1:
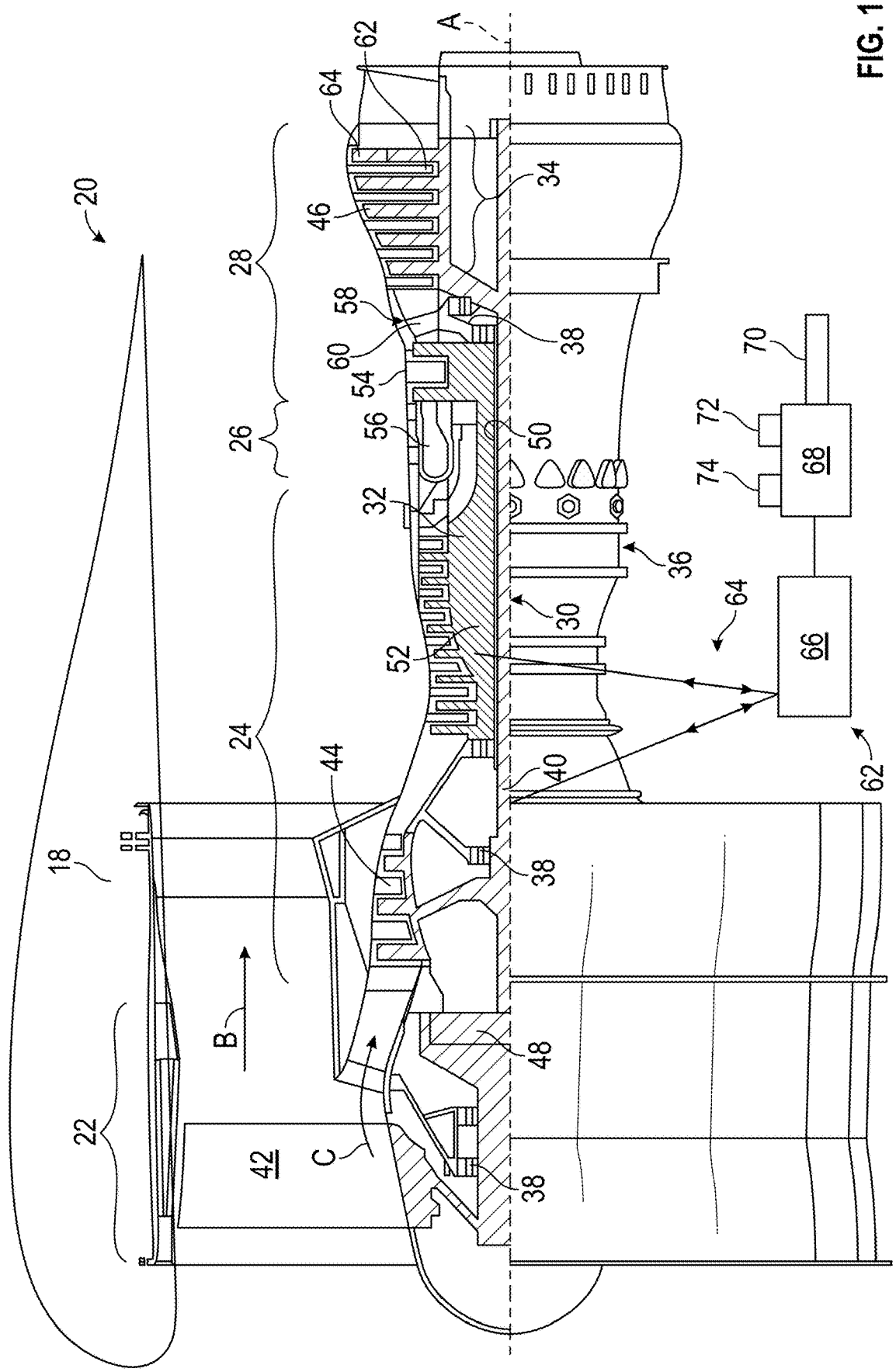
FIG. 1 is a partial cross-sectional illustration of a gas turbine engine, in accordance with an embodiment of the present disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 18, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to a fan section 22 through a speed change mechanism, which in exemplary gas turbine engine 20 is illustrated as a geared architecture 48 to drive fan blades 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor 44 and the fan blades 42 may be positioned forward or aft of the location of the geared architecture 48 or even aft of turbine section 28.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

The example gas turbine engine includes the fan section 22 that comprises in one non-limiting embodiment less than about 26 fan blades 42. In another non-limiting embodiment, the fan section 22 includes less than about 20 fan blades 42. Moreover, in one disclosed embodiment the low pressure turbine 46 includes no more than about 6 turbine rotors schematically indicated at 34. In another non-limiting example embodiment, the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and, therefore, the relationship between the number of turbine rotors 34 in the low pressure turbine 46 and the number of blades 42 in the fan section 22 disclose an example gas turbine engine 20 with increased power transfer efficiency.

The example engine 20 includes an accessory drive system 62 that receives power from both the high speed spool 32 and the low speed spool 30. The accessory drive system 62 drives an accessory gearbox 68 that includes accessory component 72 and lubricant pump 74. The accessory component 72 may include pumps, generators and other devices driven to enable operation of different engine and aircraft systems. The accessory gearbox 68 is also coupled to a starter 70. The starter 70 is capable of driving the accessory drive system 62 to start the engine 20. In this example, a tower shaft assembly 64 is coupled to both the low speed spool 30 and the high speed spool 32 to distribute power extraction between the two spools 30, 32.

Excessive power extraction from a single spool, such as the high speed spool 32, can limit operation and degrade overall performance and engine efficiency. Accordingly, the example accessory drive system 62 extracts power from both the low speed spool 30 and the high speed spool 32 to meet the overall power demands of the engine 20 and the aircraft associated with the engine.

Figure 2:
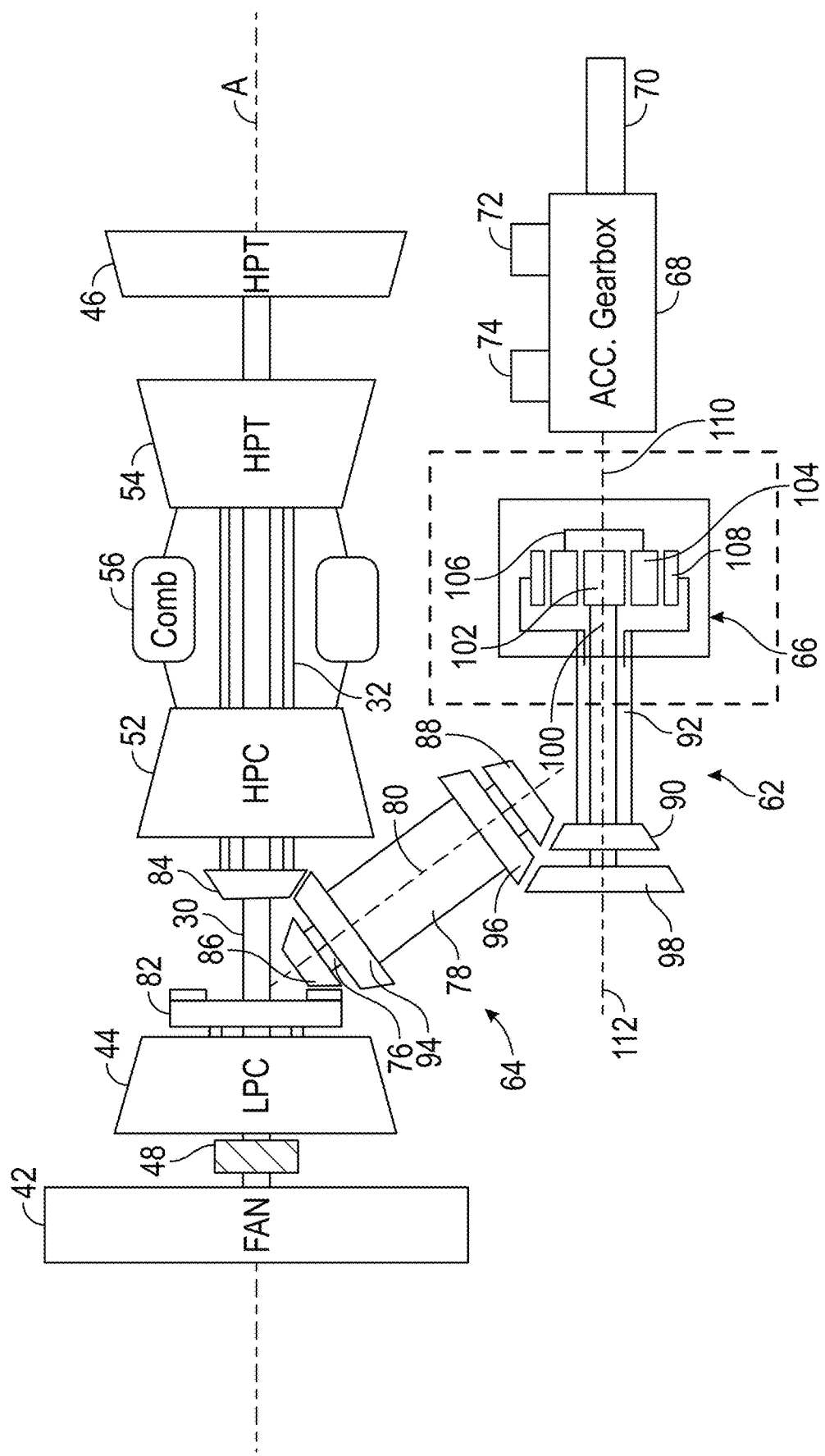
FIG. 2 illustrates a schematic representation of the example accessory drive system, in accordance with an embodiment of the present disclosure.

Referring to FIG. 2, with continued reference to FIG. 1, the example accessory drive system 62 includes a superposition gearbox 66 that is coupled between accessory gearbox 68 and the tower shaft assembly 64. The superposition gearbox 66 is an epicyclic gearbox that includes a sun gear 102 that rotates about an axis 112. A plurality of intermediate gears 104 are engaged with the sun gear 102 and supported by a carrier 106. A ring gear 108 circumscribes and is engaged with the plurality of intermediate gears 104. The example superposition gearbox 66 is not coupled to a static structure of the engine 20 and, therefore, is operated by various input combinations to provide the desired distribution of power.

In the disclosed example, the tower shaft assembly 64 includes a first tower shaft 76 that is driven by a low speed output gear 82 disposed on the low speed spool 30. A first gear 86 on the first tower shaft 76 is coupled to the low speed output gear 82. A second gear 88 is disposed on a second end of the first tower shaft 76 and engages a ring gear shaft drive gear 90 disposed on a ring gear shaft 92.

A second tower shaft 78 is coupled to a high speed output gear 84 that is driven by the high speed spool 32. The second tower shaft 78 includes a first gear 94 driven by the high speed output gear 84 on the high speed spool 32. A second gear 96 of the second tower shaft 78 is engaged to sun gear shaft drive gear 98 disposed on a sun gear shaft 100. In this example, the first tower shaft 76 and the second tower shaft 78 are disposed concentrically about a common axis 80. Moreover, the axis 80 is disposed at an angle relative to the engine longitudinal axis A and an axis 112 of the superposition gearbox 66. It should be appreciated that although the specific disclosed embodiment includes concentric tower shafts 76, 78, other configurations and orientations of the tower shafts are within the contemplation and scope of this disclosure.

First tower shaft 76 is coupled to the ring gear shaft 92 that is selectively coupled to the ring gear 108. The second tower shaft 78 is coupled to the sun gear shaft 100 that is coupled to drive the sun gear 102. The sun gear shaft 100 is directly coupled to the sun gear 102 and is not selectively engaged to the sun gear 102.

The superposition gearbox 66, therefore, has a first input provided by the first tower shaft 76 through the ring gear shaft 92 coupled to drive the ring gear 108 and a second input provided by the second tower shaft 78 to drive the sun gear shaft 100 and, thereby, the sun gear 102. An output from the superposition gearbox 66 is provided by a lay shaft 110 that is coupled to the carrier 106. The lay shaft 110 drives the accessory gearbox 68 in the disclosed example embodiment. The accessory gearbox 68 includes another gear system or plurality of gears as is required to the drive accessory components schematically illustrated at 72 and 74. Moreover, the accessory gearbox 68 is coupled to the starter 70 to provide a driving input through the lay shaft 110 to the superposition gearbox 66 to drive the high speed spool 32 during starting operation.

Figure 3:
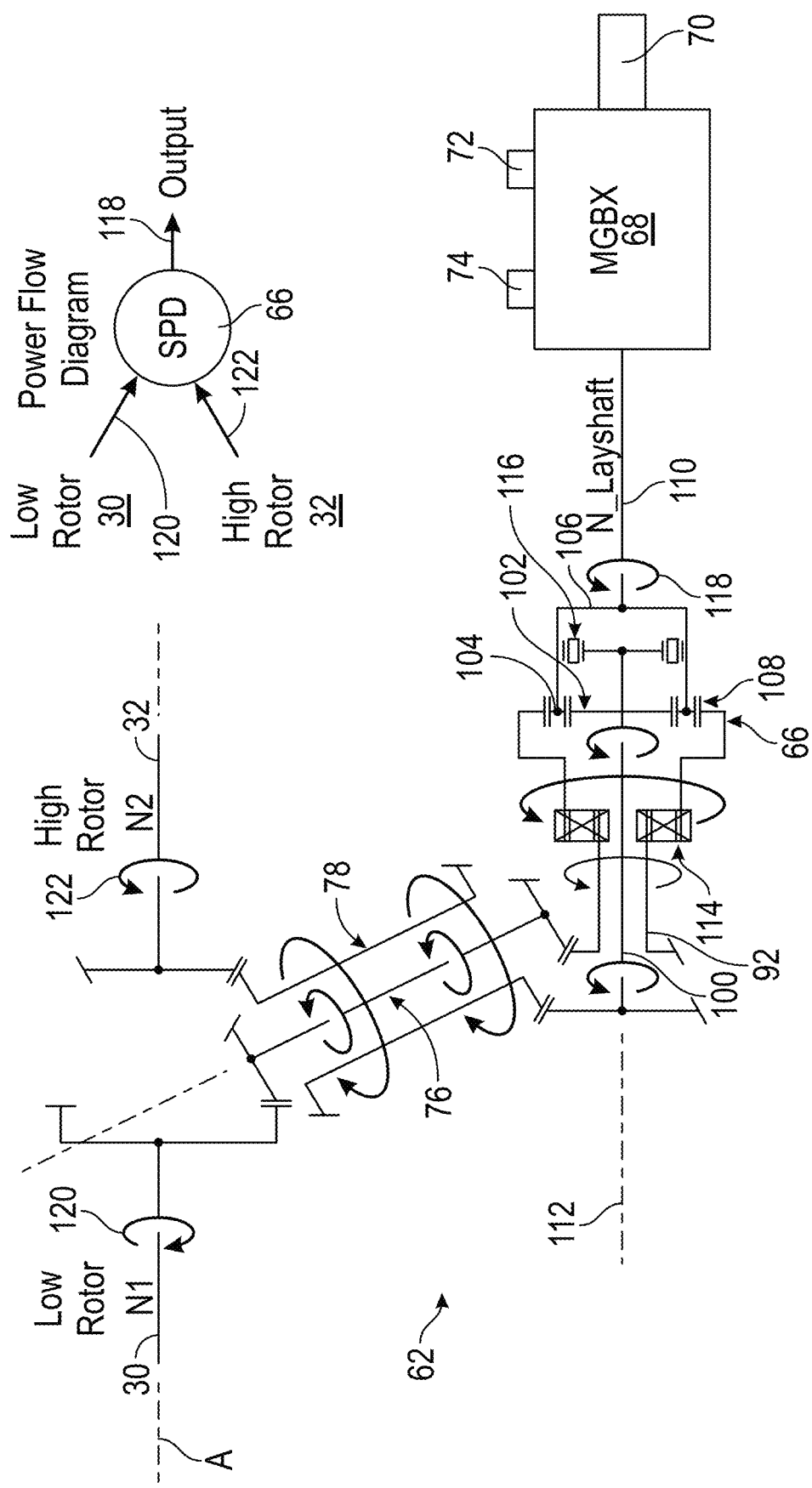
FIG. 3 is a schematic illustration of the accessory drive system in a first operating condition, in accordance with an embodiment of the present disclosure.

Referring to FIG. 3, with continued reference to FIG. 2, the example superposition gearbox 66 includes a first clutch assembly 114 that selectively couples the ring gear shaft 92 to drive the ring gear 108. The first clutch 114 selectively couples driving input from the low speed spool 30 through the first tower shaft 76 to the ring gear shaft 92 and ring gear 108.

A second clutch assembly 116 selectively couples the sun gear 102 to the carrier 106. The second clutch assembly 116 is shown uncoupled such that the sun gear 102 and the carrier 106 may rotate at different relative speeds. Coupling of the sun gear 102 to the carrier 106 enables the second tower shaft 78 to directly drive the carrier 106. Accordingly, through a selective coupling of the first clutch assembly 114 and the second clutch assembly 116 different inputs from the high speed spool 32 and the low speed spool 30 can be input through the superposition gearbox 66 to drive the lay shaft 110 and, thereby, the accessory gearbox 68.

The first clutch assembly 114 and the second clutch assembly 116 are one-way mechanical clutches that do not require control or separate independent actuation. Each of the clutch assemblies 114, 116 are automatically engaged and disengaged depending on the speed and direction of torque input. The selective actuation of the mechanical clutches 114, 116 enables both the low speed spool 30 and the high speed spool 32 to provide torque input to drive the lay shaft 110.

In the configuration for operation shown in FIG. 3, the first clutch 114 is engaged to couple the ring gear shaft 92 to the ring gear 108. Accordingly, the first tower shaft 76 driven by the low speed spool 30 is coupled to drive the ring gear 108. The second clutch assembly 116 is not engaged and is free running. The second tower shaft 78 drives the sun gear shaft 100 to drive the sun gear 102. Accordingly, the low speed spool 30 is driving the ring gear 108 and the high speed spool 32 is driving the sun gear 102. The driving inputs are both in the same rotational direction and result in an overall output through the carrier 106 to drive the lay shaft 110.

Accordingly, a rotational input, schematically indicated at 120, of the low speed spool 30 combined with a rotational input 122, schematically shown by the rotational arrows, combined within the superposition gearbox 66 generate an output, schematically shown at 118, to drive the accessory gearbox 68.

Differing rotational inputs provided by 120 and 122 may be of differing speeds and torques. The superposition gearbox 66 receives and automatically distributes the torques to provide the driving input 118 through the lay shaft 110 to drive the accessory gearbox 68.

Figure 4:
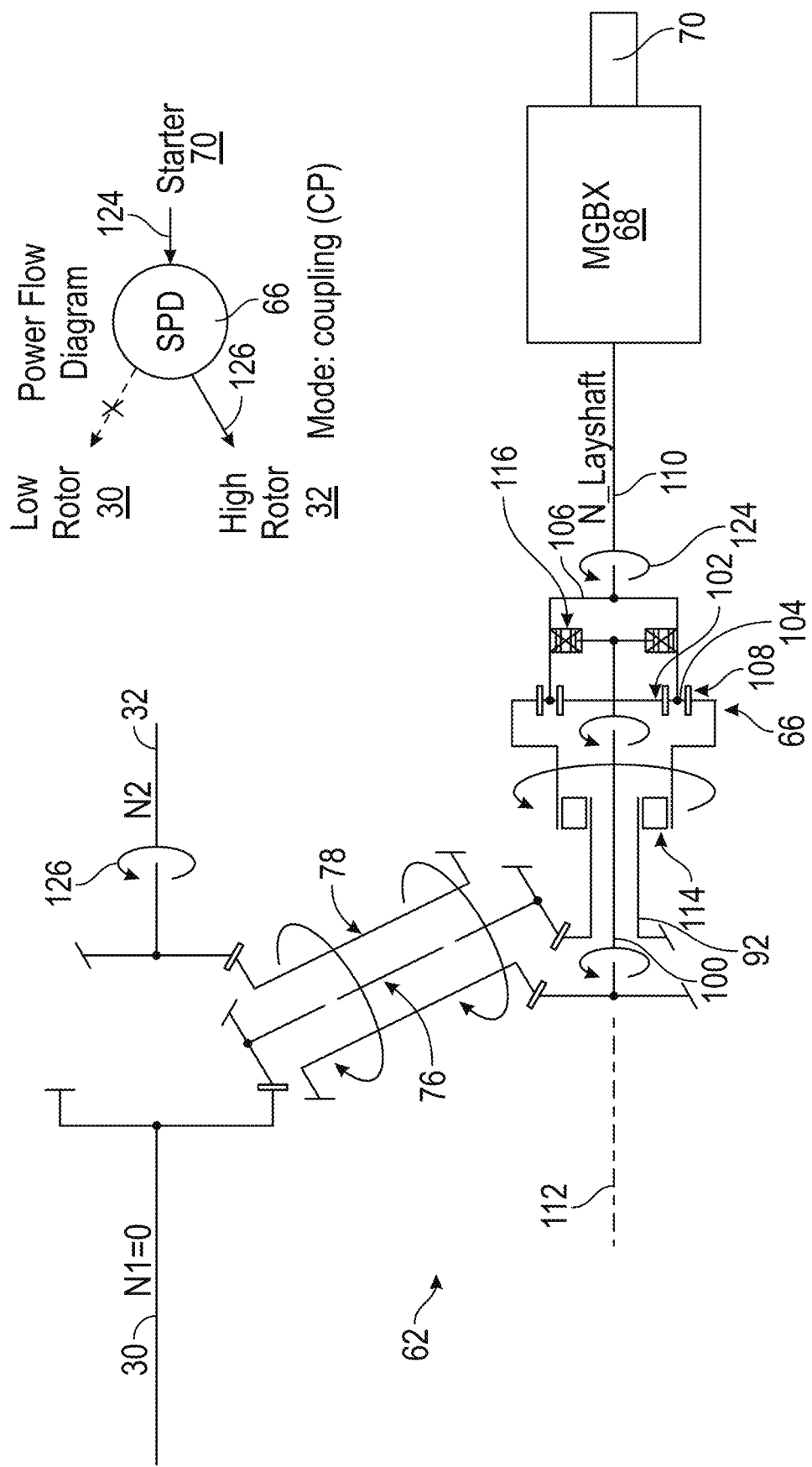
FIG. 4 is a schematic illustration of the accessory drive system in a starting operating condition, in accordance with an embodiment of the present disclosure.

Referring to FIG. 4, another schematic illustration of the disclosed drive system 62 is schematically shown configured for a starting operation configuration. In the starting configuration, starter 70 provides input torque 124 to drive the accessory gearbox 68 and the lay shaft 110 to rotate high speed spool 32. In this position, the first clutch assembly 114 is not coupled because the ring gear 108 due to the direction of torque input and rotation. Accordingly, the first tower shaft 76 is not back driven by the superposition gearbox 66. The second clutch assembly 116 is engaged to couple the carrier 106 to the sun gear shaft 100. Accordingly, rotation of the carrier 106 by the lay shaft 110 drives the sun gear shaft 100 and, thereby, the second tower shaft 78. Driving the second tower shaft 78 rotates the high speed spool 32 to provide a rotational input, schematically shown at 126. None of the torque or rotational input provided by the lay shaft 110 is transmitted to the low spool 30. The high speed spool 32 is driven until the engine starts and begins spinning under its own power as is known and understood by those skilled in gas turbine engine structure and operation.

Figure 5:
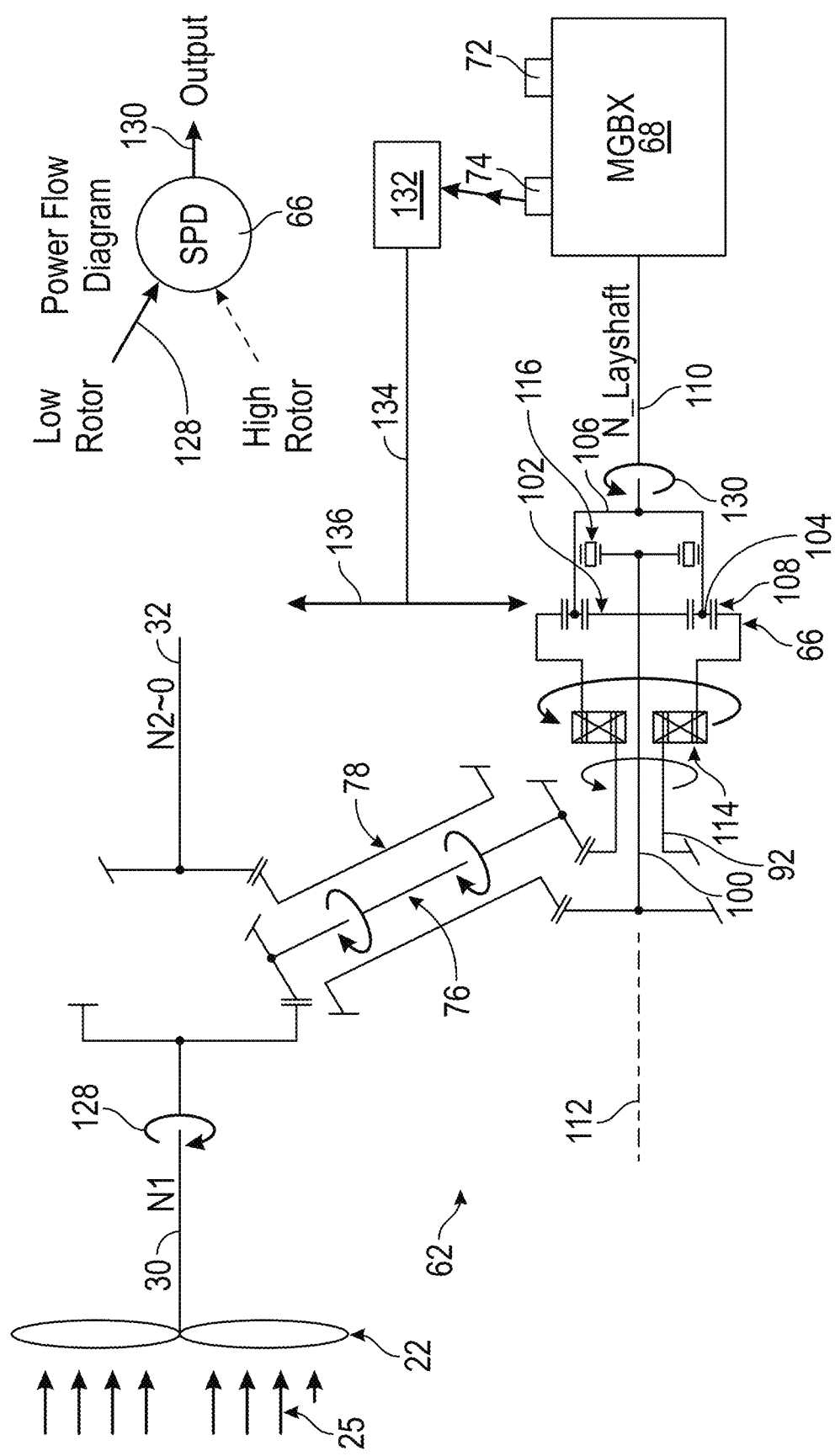
FIG. 5 is a schematic illustration of the example accessory drive system in a forward wind milling operating condition, in accordance with an embodiment of the present disclosure.

Referring to FIG. 5, with continued reference to FIG. 2, a forward wind milling operating condition is schematically shown and includes an input of torque on the low speed spool 30 from the fan section 22. Airflow schematically shown at 25 passing through the fan 22 when the engine is not operating will cause rotation of the low spool 30. Rotation of the low spool 30 in turn causes rotation of various structures in the engine. Forward rotation of the engine requires lubricant to be supplied. In this example embodiment, rotation of the low spool 30 causes rotation of the geared architecture 48 (FIGS. 1 and 2) and therefore creates a need to provide lubricant to rotating components. Moreover, other components of the engine such as the support bearings as well of the superposition gearbox 66 require lubricant when rotated. Accordingly, the disclosed accessory drive system 62 drives the lay shaft 110 to drive the accessory gearbox 68 that in turn drives a lubricant pump 74. The lubricant pump 74 drives lubricant through a system of conduits schematically shown at 134 of the lubrication system schematically indicated at 132 that provides lubricant to engine components as indicated at 136 and the superposition gearbox 66. The example lubrication system 132 is shown schematically and is contemplated to include features that distribute lubricant throughout the engine 20 as would be understood by one skilled in turbine engines.

Operation of the accessory drive system 62 in the illustrated forward wind milling operating condition includes rotation of the low speed spool 30 caused by airflow 25 through the fan section 22. Rotation of the low speed spool 30 drives the first tower shaft 76. The first clutch 114 is coupled such that rotation of the first tower shaft 76 rotates the ring gear shaft 92 and the ring gear 108. The high speed spool 32 is stationary and does not provide an input to the second tower shaft 78 and the sun gear 102. The sun gear 102 is therefore held stationary. The sun gear 102 rotates with the carrier 106 because the second clutch assembly 116 does not allow the carrier 106 to rotate faster than the sun gear 102. Accordingly, because the high speed spool 32 is attached to the sun gear 102, the high speed spool 32 becomes a parasitic drag on the system to slow or prevent rotation of the sun gear 102. Rotation of the ring gear 108 in combination with the sun gear 102 drives the intermediate gears 104 about the axis 112. Rotation of the intermediate gears 104 drives the carrier 106 and thereby the lay shaft 110. Accordingly, the input schematically indicated at 128 from the low speed spool 30 into the superposition gearbox 66 generates an output 130 to drive the accessory gearbox 68. Driving of the gearbox 68 in turn drives the pump 74 to operate the lubrication system 132.

Figure 6:
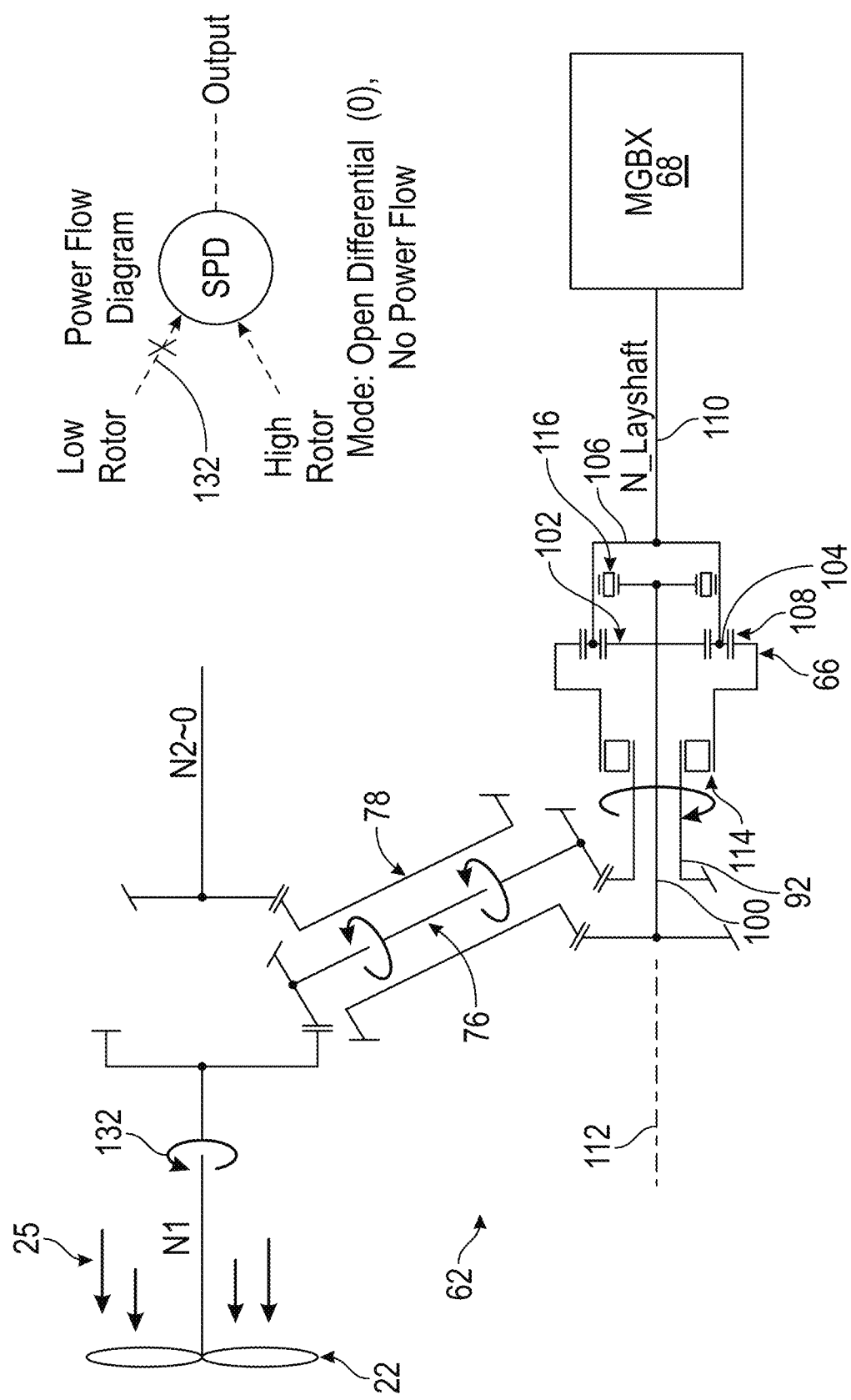
FIG. 6 is a schematic illustration of the auxiliary drive system in an aft wind milling operating condition, in accordance with an embodiment of the present disclosure.

Referring to FIG. 6, an aft wind milling operating condition is schematically shown where airflow 25 from aft of the engine is driving rotation of the fan 22. Airflow 25 from the aft direction causes the fan section 22 and thereby the low speed spool 30 to rotate in about the axis A in a direction that does not cause coupling between the ring gear shaft 92 and the ring gear 108. Accordingly, neither the torque from the low speed spool 30 or the high speed spool 32 is transmitted through the superposition gearbox 66. In the reverse wind milling operating condition, rotation of the high speed spool 32 is not possible and therefore lubricant flow is not necessary. Accordingly, the first clutch 114 does not couple the ring gear shaft 92 to the ring gear 108 and no torque is transferred to the accessory gearbox 68.

The example accessory drive system 62 includes a superposition gearbox 66 that automatically distributes input driving torque between the low speed spool 30, the high speed spool 32 and the accessory gearbox 68 as required during engine operation. The selective operation of the superposition gearbox 66 is enabled by first and second one-way clutches that provide different combinations of inputs and outputs that automatically couple based engine operating conditions.

Figure 7:
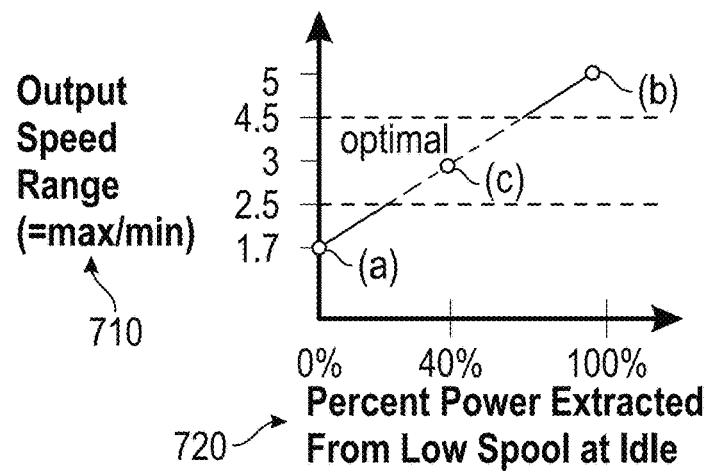
FIG. 7 illustrates a performance chart of the accessory drive system, in accordance with an embodiment of the present disclosure.
Figure 8:
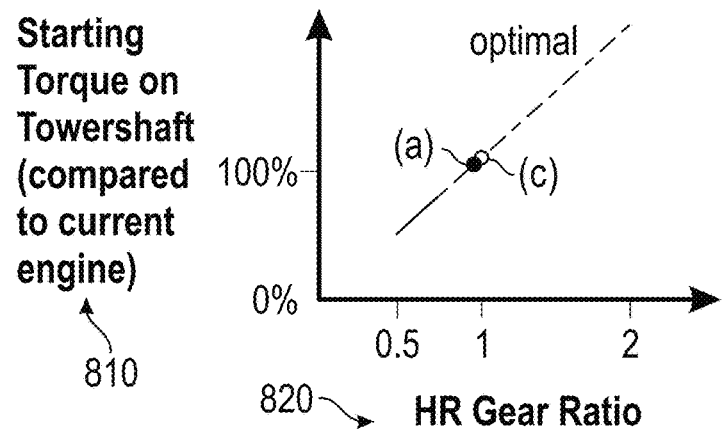
FIG. 8 illustrates a performance chart of the accessory drive system, in accordance with an embodiment of the present disclosure.
Figure 9:
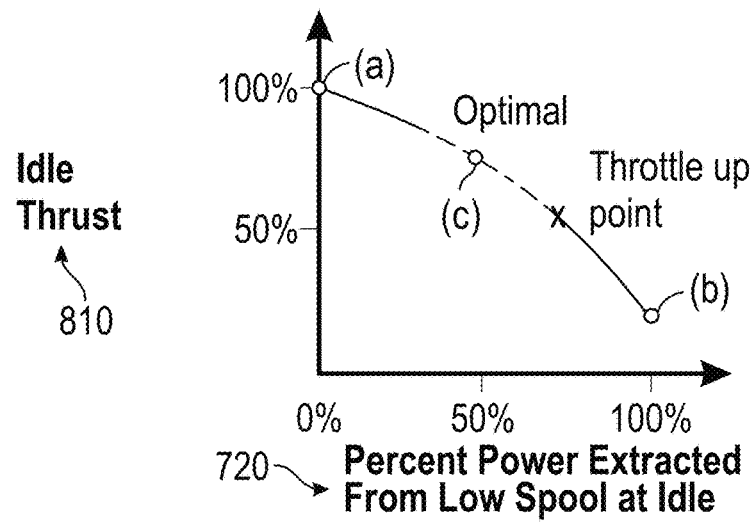
FIG. 9 illustrates a performance chart of the accessory drive system, in accordance with an embodiment of the present disclosure.

Referring now to FIGS. 2 and 7-9, with continued reference to FIGS. 1 and 3-6, various performance charts of the accessory drive system 62 are illustrated in FIGS. 7-9, in accordance with the present disclosure. The speed into the superposition gearbox 66 is a function of both the speed of the high pressure compressor 52 and the speed of the low pressure compressor 44 because the superposition gearbox 66 has two input shafts including the sun gear shaft 100 that is driven by the high pressure compressor 52 and the ring gear shaft 92 that is driven by the low pressure compressor 44. Since the low speed spool 30 has a large speed excursion (i.e., max speed minus min speed) and the high speed spool 32 has a relatively small speed excursion, the design of the superposition gearbox 66 is a tradeoff of many factors, including, but not limited to, output speed excursion, power split, starting torque, and idle thrust. Therefore, the selection of gear ratios in the low speed spool drive train, high speed spool drive train, and the superposition gearbox 66 are difficult to determine.

A low speed spool drive train runs from the low speed output gear 82 to the ring gear shaft drive gear 90 and includes the low speed output gear 82, the first gear 86, the second gear 88, and the ring gear shaft drive gear 90. The low speed spool drive train gear ratio is measured from the low speed output gear 82 to the ring gear shaft drive gear 90. The low speed spool drive train gear ratio may be defined as a ratio of the number of gear teeth of the first gear 86 to the number of gear teeth of the low speed output gear 82 (i.e., the number of gear teeth of the first gear 86 divided by the number of gear teeth of the low speed output gear 82) multiplied by a ratio of the number of gear teeth of the ring gear shaft drive gear 90 to the number of gear teeth of the second gear 88 (i.e., the number of gear teeth of the ring gear shaft drive gear 90 divided by the number of gear teeth of the second gear 88), as illustrated by equation (i) below.

$$\text{low speed spool drive train gear ratio} = \left(\frac{\text{number of gear teeth of the first gear 86}}{\text{number of gear teeth of the low speed output gear 82}}\right) * \left(\frac{\text{number of gear teeth of the ring gear shaft drive gear 90}}{\text{number of gear teeth of the second gear 88}}\right) \quad \text{(i)}$$

A high speed spool drive train runs from the high speed output gear 84 to the sun gear shaft drive gear 98 and includes the high speed output gear 84, the first gear 94, the second gear 96, and the sun gear shaft drive gear 98. The high drive spool drive train gear ratio is measured from the high speed output gear 84 to the sun gear shaft drive gear 98. The high speed spool drive train gear ratio may be defined as a ratio of the number of gear teeth of the first gear 94 to the number of gear teeth of the high speed output gear 84 (i.e., the number of gear teeth of the first gear 94 divided by the number of gear teeth of the high speed output gear 84) multiplied by a ratio of the number of gear teeth of the sun gear shaft drive gear 98 to the number of gear teeth of the second gear 96 (i.e., the number of gear teeth of the sun gear shaft drive gear 98 divided by the number of gear teeth of the second gear 96), as illustrated by equation (ii) below.

$$\text{high speed spool drive train gear ratio} = \left(\frac{\text{number of gear teeth of the first gear 94}}{\text{number of gear teeth of the high speed output gear 84}}\right) * \left(\frac{\text{number of gear teeth of the sun gear shaft drive gear 98}}{\text{number of gear teeth of the second gear 96}}\right) \quad \text{(ii)}$$

The epicycle gear ratio of the superposition gearbox 66 is measured from the ring gear 108 to the sun gear 102. The epicycle gear ratio may be defined as a ratio of the number of gear teeth of the ring gear 108 to the number of gear teeth of the sun gear 102 (i.e., the number of gear teeth of the ring gear 108 divided by the number of gear teeth of the sun gear 102), as illustrated by equation (iii) below.

$$\text{epicycle gear ratio} = \left(\frac{\text{number of gear teeth of the ring gear 108}}{\text{number of gear teeth of the sun gear 102}}\right) \quad \text{(iii)}$$

The embodiments disclosed herein seek to provide a superposition gearbox 66 in which the low speed spool drive train gear ratio and the high speed spool drive train gear ratio are in a range that optimizes four factors including: (1) minimize speed excursion of the accessory drivetrain (i.e., minimize speed excursion of lay shaft 110 drives the accessory gearbox 68); (2) maximize power extraction from the low pressure compressor 44 at idle; and (3) minimize starting torque on the second tower shaft 78; and (4) reduce idle thrust to maximum acceptable level.

The low speed spool drive train gear ratio may be between 0.5 to 2.0, 0.6 to 1.9, 0.7 to 1.8, 0.8 to 1.7, 0.9 to 1.6, 1.0 to 1.5, 1.1 to 1.4, or 1.2 to 1.3. The low speed spool drive train gear ratio may be about equal to 0.5, 0.6, 0.7, 0.8, 0.9, 1.0, 1.1, 1.2, 1.3, 1.4, 1.5, 1.6, 1.7, 1.8, 1.9, or 2.0.

The high speed spool drive train gear ratio may be between 0.8 to 2.0, 0.9 to 1.9, 1.0 to 1.8, 1.1 to 1.7, 1.2 to 1.6, 1.3 to 1.5, 1.3 to 1.4, or 1.4 to 1.5. The low speed spool drive train gear ratio may be about equal to 0.8, 0.9, 1.0, 1.1, 1.2, 1.3, 1.4, 1.5, 1.6, 1.7, 1.8, 1.9, or 2.0.

The epicycle gear ratio may be between 2.5 to 4.5, 2.6 to 4.4, 2.7 to 4.3, 2.8 to 4.2, 2.9 to 4.1, 3.0 to 4.0, 3.1 to 3.9, 3.2 to 3.8, 3.3 to 3.7, 3.4 to 3.6, 3.5 to 3.6, or 3.4 to 3.5. The epicycle gear ratio may be about equal to 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, or 4.5.

As illustrated in FIGS. 7-9, data point (a) represents a conventional engine designed have 0% power extracted from the low speed spool 30, data point (b) is the low speed spool extraction engine that utilizes 100% power extracted from the low speed spool 30, and data point (c) is the low speed spool extraction engine that utilizes a combination of power extracted from the low speed spool 30 and the high speed spool 32. Data point (c) represents an optimal location of the charts illustrated in FIGS. 7-9.

As illustrated in FIG. 7, a low speed spool drive train gear ratio between 0.5 to 2.0, a high speed spool drive train gear ratio between 0.8 to 2.0, and an epicycle gear ratio may be between 2.5 to 4.5 produce an output speed 710 between 2.5 and 4.5 at a low spool power extract percentage 720 of between 20% and 80%. Therefore accomplishing the goals to (1) minimize speed excursion of the accessory drivetrain (i.e., minimize speed excursion of lay shaft 110 drives the accessory gearbox 68) and (2) maximize power extraction from the low pressure compressor 44 at idle.

As illustrated in FIG. 8, illustrates that a large HR gear ratio (e.g., a gear ratio >1) may be necessary to slow down the high spool speed 32 to the sun gear 102 and as a result the torque on the second tower shaft 78 increases. Advantageously, since the second tower shaft 78 is on the outside of the first tower shaft 76, the second tower shaft 78 can better carry this increase in torque. Therefore, the optimum can be at greater than 100% torque since the second tower shaft 78 is larger. Data point (a) represents a conventional engine and represents a baseline where data point (c) is assumed to be about the same as the baseline because even with 100% power extracted from the low speed spool 30, the gas turbine engine 20 by turning the high speed spool 32.

As illustrated in FIG. 9, a low speed spool drive train gear ratio between 0.5 to 2.0, a high speed spool drive train gear ratio between 0.8 to 2.0, and an epicycle gear ratio may be between 2.5 to 4.5 produce an idle thrust 810 between 80% and 50% at a low spool power extract percentage 720 of between 20% and 80%. Therefore accomplishing the goal to (4) reduce idle thrust to maximum acceptable level. The "maximum acceptable level" of idle thrust depends on the bypass ratio and fan geometry of the gas turbine engine 20. It is advantageous to reduce idle thrust 810 just enough so that the aircraft can taxi without riding the brakes (e.g., too much idle thrust) or by having to throttle up excessively and burning fuel (e.g., too little idle thrust).

Advantageously, a low speed spool drive train gear ratio between 0.5 to 2.0, a high speed spool drive train gear ratio between 0.8 to 2.0, and an epicycle gear ratio may be between 2.5 to 4.5 result in a parameterized optimization of an epicyclic superposition drive for multi-rotor power extraction. Some benefits of a low speed spool drive train gear ratio between 0.5 to 2.0, a high speed spool drive train gear ratio between 0.8 to 2.0, and an epicycle gear ratio may be between 2.5 to 4.5 include an increased high pressure compressor 52 stall margin at idle, reduced idle thrust, a reduced generator speed excursion (e.g., therefore smaller lighter generator as the accessory component 72), minimized packaging of the second tower shaft 78 (e.g., less obstruction to the gas path), and optimized idle thrust level.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A gas turbine engine comprising:
   a low speed spool including a low pressure compressor;
   a low speed output gear disposed on the low speed spool;
   a high speed spool including a high pressure compressor;
   a high speed output gear disposed on the high speed spool;
   a first tower shaft engaged to the low speed spool at the low speed output gear;
   a second tower shaft engaged to the high speed spool at the high speed output gear;
   a superposition gearbox including a sun gear, a plurality of intermediate gears engaged to the sun gear and supported in a carrier, and a ring gear circumscribing the intermediate gears;
   a ring gear shaft coupled to drive the ring gear;
   a ring gear shaft drive gear disposed on the ring gear shaft and engaged with the first tower shaft;
   a sun gear shaft coupled to drive the sun gear;
   a sun gear shaft drive gear disposed on a sun gear shaft and engaged with the second tower shaft,
   wherein a low speed spool drive train gear ratio is between 0.5 to 2.0, the low speed spool drive train gear ratio being measured from the low speed output gear to the ring gear shaft drive gear;
   a first clutch assembly for selectively coupling the first tower shaft to the ring gear;
   a second clutch assembly for selectively coupling the sun gear to the carrier; and
   an accessory gearbox driven by an output of the superposition gearbox.

2. The gas turbine engine of claim 1, wherein the output of the superposition gearbox comprises a lay shaft coupled to the carrier.

3. The gas turbine engine of claim 1, wherein the first tower shaft and the second tower shaft are concentric about a common axis.

4. The gas turbine engine of claim 1, wherein the first tower shaft and the second tower shaft are disposed about different axes.

5. The gas turbine engine of claim 1, wherein the first clutch assembly and the second clutch assembly comprise one-way mechanical clutches.

6. The gas turbine engine of claim 1, wherein the superposition gearbox is not fixed to a static structure of the engine.

7. The gas turbine engine of claim 1, wherein a high speed spool drive train gear ratio is between 0.8 to 2.0, the high speed spool drive train gear ratio being measured from the high speed output gear to the sun gear shaft drive gear.

8. The gas turbine engine of claim 1, wherein an epicycle gear ratio is between 2.5 to 4.5, the epicycle gear ratio being measured from the ring gear to the sun gear.

9. The gas turbine engine of claim 7, wherein an epicycle gear ratio is between 2.5 to 4.5, the epicycle gear ratio being measured from the ring gear to the sun gear.

10. A gas turbine engine comprising:
a low speed spool including a low pressure compressor;
a low speed output gear disposed on the low speed spool;
a high speed spool including a high pressure compressor;
a high speed output gear disposed on the high speed spool;
a first tower shaft engaged to the low speed spool at the low speed output gear;
a second tower shaft engaged to the high speed spool at the high speed output gear;
a superposition gearbox including a sun gear, a plurality of intermediate gears engaged to the sun gear and supported in a carrier, and a ring gear circumscribing the intermediate gears;
a ring gear shaft coupled to drive the ring gear;
a ring gear shaft drive gear disposed on the ring gear shaft and engaged with the first tower shaft;
a sun gear shaft coupled to drive the sun gear;
a sun gear shaft drive gear disposed on a sun gear shaft and engaged with the second tower shaft,
wherein a high speed spool drive train gear ratio is between 0.8 to 2.0, the high speed spool drive train gear ratio being measured from the high speed output gear to the sun gear shaft drive gear;
a first clutch assembly for selectively coupling the first tower shaft to the ring gear;
a second clutch assembly for selectively coupling the sun gear to the carrier; and
an accessory gearbox driven by an output of the superposition gearbox.

11. The gas turbine engine of claim 10, wherein the output of the superposition gearbox comprises a lay shaft coupled to the carrier.

12. The gas turbine engine of claim 10, wherein the first tower shaft and the second tower shaft are concentric about a common axis.

13. The gas turbine engine of claim 10, wherein the first tower shaft and the second tower shaft are disposed about different axes.

14. The gas turbine engine of claim 10, wherein the first clutch assembly and the second clutch assembly comprise one-way mechanical clutches.

15. The gas turbine engine of claim 10, wherein the superposition gearbox is not fixed to a static structure of the engine.

16. The gas turbine engine of claim 10, wherein an epicycle gear ratio is between 2.5 to 4.5, the epicycle gear ratio being measured from the ring gear to the sun gear.

17. A gas turbine engine comprising:
a low speed spool including a low pressure compressor;
a low speed output gear disposed on the low speed spool;
a high speed spool including a high pressure compressor;
a high speed output gear disposed on the high speed spool;
a first tower shaft engaged to the low speed spool at the low speed output gear;
a second tower shaft engaged to the high speed spool at the high speed output gear;
a superposition gearbox including a sun gear, a plurality of intermediate gears engaged to the sun gear and supported in a carrier, and a ring gear circumscribing the intermediate gears;
a ring gear shaft coupled to drive the ring gear;
a ring gear shaft drive gear disposed on the ring gear shaft and engaged with the first tower shaft;
a sun gear shaft coupled to drive the sun gear;
a sun gear shaft drive gear disposed on a sun gear shaft and engaged with the second tower shaft,
wherein an epicycle gear ratio is between 2.5 to 4.5, the epicycle gear ratio being measured from the ring gear to the sun gear;
a first clutch assembly for selectively coupling the first tower shaft to the ring gear;
a second clutch assembly for selectively coupling the sun gear to the carrier; and
an accessory gearbox driven by an output of the superposition gearbox.

18. A gas turbine engine comprising:
a low speed spool including a low pressure compressor;
a low speed output gear disposed on the low speed spool;
a high speed spool including a high pressure compressor;
a high speed output gear disposed on the high speed spool;
a first tower shaft engaged to the low speed spool at the low speed output gear;
a second tower shaft engaged to the high speed spool at the high speed output gear;
a superposition gearbox including a sun gear, a plurality of intermediate gears engaged to the sun gear and supported in a carrier, and a ring gear circumscribing the intermediate gears;
a ring gear shaft coupled to drive the ring gear;
a ring gear shaft drive gear disposed on the ring gear shaft and engaged with the first tower shaft;
a sun gear shaft coupled to drive the sun gear; and
a sun gear shaft drive gear disposed on a sun gear shaft and engaged with the second tower shaft,
wherein a low speed spool drive train gear ratio is between 0.5 to 2.0, the low speed spool drive train gear ratio being measured from the low speed output gear to the ring gear shaft drive gear, and
wherein the first tower shaft and the second tower shaft are concentric about a common axis.

19. A gas turbine engine comprising:
a low speed spool including a low pressure compressor;
a low speed output gear disposed on the low speed spool;
a high speed spool including a high pressure compressor;
a high speed output gear disposed on the high speed spool;
a first tower shaft engaged to the low speed spool at the low speed output gear;
a second tower shaft engaged to the high speed spool at the high speed output gear;
a superposition gearbox including a sun gear, a plurality of intermediate gears engaged to the sun gear and supported in a carrier, and a ring gear circumscribing the intermediate gears;

a ring gear shaft coupled to drive the ring gear;
a ring gear shaft drive gear disposed on the ring gear shaft and engaged with the first tower shaft;
a sun gear shaft coupled to drive the sun gear; and
a sun gear shaft drive gear disposed on a sun gear shaft and engaged with the second tower shaft,
wherein a high speed spool drive train gear ratio is between 0.8 to 2.0, the high speed spool drive train gear ratio being measured from the high speed output gear to the sun gear shaft drive gear, and
wherein the first tower shaft and the second tower shaft are concentric about a common axis.

20. A gas turbine engine comprising:
a low speed spool including a low pressure compressor;
a low speed output gear disposed on the low speed spool;
a high speed spool including a high pressure compressor;
a high speed output gear disposed on the high speed spool;
a first tower shaft engaged to the low speed spool at the low speed output gear;
a second tower shaft engaged to the high speed spool at the high speed output gear;
a superposition gearbox including a sun gear, a plurality of intermediate gears engaged to the sun gear and supported in a carrier, and a ring gear circumscribing the intermediate gears;
a ring gear shaft coupled to drive the ring gear;
a ring gear shaft drive gear disposed on the ring gear shaft and engaged with the first tower shaft;
a sun gear shaft coupled to drive the sun gear; and
a sun gear shaft drive gear disposed on a sun gear shaft and engaged with the second tower shaft,
wherein an epicycle gear ratio is between 2.5 to 4.5, the epicycle gear ratio being measured from the ring gear to the sun gear, and
wherein the first tower shaft and the second tower shaft are concentric about a common axis.

* * * * *